(12) United States Patent
Li et al.

(10) Patent No.: US 9,115,519 B2
(45) Date of Patent: Aug. 25, 2015

(54) DAMPING STRUCTURE

(75) Inventors: Caiyou Li, Zhangzhou (CN); Feiyong Li, Zhangzhou (CN)

(73) Assignee: Feiyong Li, Xiamen (CN)

( * ) Notice: Subject to any disclaimer, the term of this patent is extended or adjusted under 35 U.S.C. 154(b) by 75 days.

(21) Appl. No.: 13/978,507

(22) PCT Filed: Jan. 13, 2012

(86) PCT No.: PCT/CN2012/070319
§ 371 (c)(1),
(2), (4) Date: Jul. 5, 2013

(87) PCT Pub. No.: WO2012/095020
PCT Pub. Date: Jul. 19, 2012

(65) Prior Publication Data
US 2013/0276268 A1 Oct. 24, 2013

(30) Foreign Application Priority Data

Jan. 14, 2011 (CN) .......................... 2011 1 0007867

(51) Int. Cl.
| | | |
|---|---|---|
| E05F 3/20 | (2006.01) | |
| E05D 11/00 | (2006.01) | |
| E05F 5/00 | (2006.01) | |
| E05F 5/06 | (2006.01) | |

(Continued)

(52) U.S. Cl.
CPC ................ *E05D 11/00* (2013.01); *A47K 13/12* (2013.01); *E05F 5/00* (2013.01); *E05F 5/06* (2013.01); *F16F 9/3214* (2013.01); *F16F 9/3228* (2013.01); *F16F 9/3235* (2013.01); *E05Y 2201/254* (2013.01); *E05Y 2201/266* (2013.01); *E05Y 2900/614* (2013.01); *F16F 2232/06* (2013.01); *Y10T 16/54095* (2015.01)

(58) Field of Classification Search
CPC .................................. A47K 13/12; E05F 3/20
USPC ............ 16/49, 50, 54, 82, 306, 307, 342, 353
See application file for complete search history.

(56) References Cited

U.S. PATENT DOCUMENTS 5,109,571 A * 5/1992 Ohshima et al. ................. 16/307
5,419,013 A * 5/1995 Hsiao ............................... 16/319

(Continued)

FOREIGN PATENT DOCUMENTS

| CN | 2173840 Y | 8/1994 |
|---|---|---|
| CN | 201671468 U | 12/2010 |

(Continued)

*Primary Examiner* — Victor Batson
*Assistant Examiner* — Jason W San
(74) *Attorney, Agent, or Firm* — Rabin & Berdo, P.C.

(57) ABSTRACT

A damping mechanism has a housing body defining a cavity with a central axis, a threaded section disposed with female threads revolving about the central axis and a smooth section; a rotating shaft inserted into the cavity; and a piston, wherein the piston comprises a threaded section disposed with male threads revolving about the central axis and a piston head. The threaded section of the cavity and the threaded section of the piston constitute a screw-on fit relationship between the female and male threads. The piston head is clearance-fitted or seal-fitted with the smooth section of the cavity. An axial hole section of the piston is clearance-fitted or seal-fitted with the rotating shaft. The rotating shaft is provided with a radially outwardly-opening and axially-extending oiling slot on the sliding path of the piston head while the depth and/or width of the oiling slot changes gradually.

13 Claims, 13 Drawing Sheets

(51) Int. Cl.
*F16F 9/32* (2006.01)
*A47K 13/12* (2006.01)

(56) References Cited

U.S. PATENT DOCUMENTS

| | | | | |
|---|---|---|---|---|
| 6,205,619 | B1* | 3/2001 | Jang | 16/352 |
| 6,464,052 | B1* | 10/2002 | Hsiao | 188/290 |
| 7,051,618 | B2* | 5/2006 | Anton et al. | 464/180 |
| 8,266,764 | B2* | 9/2012 | Costabel et al. | 16/54 |
| 8,516,657 | B2* | 8/2013 | Yoshida | 16/50 |
| 8,745,820 | B2* | 6/2014 | Janak | 16/54 |
| 2010/0205774 | A1* | 8/2010 | Yoshida | 16/250 |
| 2010/0270113 | A1* | 10/2010 | Ogawa | 188/281 |
| 2011/0209305 | A1* | 9/2011 | Chen | 16/83 |
| 2012/0080278 | A1* | 4/2012 | Lee | 188/283 |
| 2012/0090932 | A1* | 4/2012 | Liu | 188/290 |
| 2014/0053369 | A1* | 2/2014 | Miglioranzo | 16/54 |
| 2014/0223691 | A1* | 8/2014 | Cheng et al. | 16/50 |

FOREIGN PATENT DOCUMENTS

| | | |
|---|---|---|
| CN | 202148758 U | 2/2012 |
| JP | 62-261727 A | 11/1987 |

* cited by examiner

DAMPING STRUCTURE

FIELD OF THE INVENTION

The present invention relates to a damping mechanism for, for example pivotally connecting a pivotal rotation piece like toilet lid and a fixing seat like toilet seat.

BACKGROUND OF THE INVENTION

For the noise generated through a toilet lid falling down and striking a toilet seat or through a door being shut and hitting a doorframe, the development of small applicable damping structures have been ongoing in the industry for the muting effect. Although pluralities of damping devices exist on the market, they are provided with a sharply decreasing performance and a short life after used for a while.

SUMMARY OF THE INVENTION

Therefore, the present invention provides a damping mechanism with long service life for pivotally connecting a pivotal rotation piece and a fixing seat, comprising:

A body connected with one of the pivotal rotation piece and the fixing seat, the body defining a cavity with a central axis, the cavity comprising a threaded section disposed with female threads revolving about the central axis and a smooth section;

A rotating shaft, one end of which is inserted into the cavity, the other end is connected with the other one of the pivotal rotation piece and fixing seat; and A piston, comprises a threaded section disposed with male threads around the central axis and a piston head. The threaded section of the cavity and the threaded section of the piston constitute a screw-on fit relationship between the female and male threads. The piston can slide on the rotating shaft along the central axis. The piston head is radially clearance-fitted or seal-fitted with the smooth section of the cavity. An axial hole section of the piston is radially clearance-fitted or seal-fitted with the rotating shaft, thereby dividing the cavity along the central axial direction into a first sub cavity containing the threaded section of the cavity and a second sub cavity axially opposite to the first sub cavity. When the piston revolves along with the rotating shaft and shifts axially, the fluid filled in the first and second sub cavities is forced to flow from one sub cavity to another through the radial clearance between the axial hole section of the piston and the rotating shaft, and/or through the radial clearance between the piston head and the smooth section of the cavity, thus, it can provide a damping effect on the relative rotation between the rotating shaft and the body. The rotating shaft is provided with a radially outwardly-opening and axially-extending oiling slot on the sliding path of the piston head while the depth or width of the oiling slot changes gradually.

The present invention also provides another damping mechanism, for pivotally connecting a pivotal rotation piece and a fixing seat, comprises:

A body connected with one of the pivotal rotation piece and the fixing seat; the body defining a cavity having a central axis, the cavity comprising a threaded section disposed with female threads revolving about the central axis;

A rotating shaft inserted into the cavity, for being connected with the other one of the pivotal rotation piece and fixing seat; and A piston, wherein the piston comprises a threaded section disposed with male threads revolving about the central axis. The threaded section of the cavity and the threaded section of the piston constitute a screw-on fit relationship between the female and male threads. The piston can slide on the rotating shaft along the central axis. An axial hole section of the piston is radially clearance-fitted or seal-fitted with the rotating shaft, thereby dividing the cavity along the central axial direction into a first sub cavity and a second sub cavity axially opposite to the first sub cavity. When the piston revolves along with the rotating shaft and shifts axially, the fluid filled in the first and second sub cavities is forced to flow from one sub cavity to another through the clearance between the piston and the rotating shaft, and/or through the clearance between the female and male threads, thus, it can provide a damping effect on the relative rotation between the rotating shaft and the body. The rotating shaft is provided with a radially outwardly-opening and axially-extending oiling slot on the sliding path of the piston head while the depth or width of the oiling slot changes gradually.

The present invention provides another damping mechanism again, for pivotally connecting a pivotal rotation piece and a fixing seat. The damping mechanism comprises:

A body connected with one of the pivotal rotation piece and the fixing seat, the body defining a cavity having a central axis, the cavity comprising a threaded section disposed with female threads revolving about the central axis and a smooth section disposed with one or more axially oiling slots;

A rotating shaft inserted into the cavity, for being connected with the other one of the pivotal rotation piece and fixing seat; and A piston, wherein the piston comprises a threaded section disposed with male threads revolving about the central axis and a piston head. The threaded section of the cavity and the threaded section of the piston constitute a screw-on fit relationship between the female and male threads. The piston can slide on the rotating shaft along the central axis. The piston head is radially clearance-fitted or seal-fitted with the smooth section of the cavity in addition to the oiling slot area. An axial hole section of the piston is radially clearance-fitted or seal-fitted with the rotating shaft, thereby dividing the cavity along the central axial direction into a first sub cavity containing the threaded section of the cavity and a second sub cavity axially opposite to the first sub cavity. When the piston revolves along with the rotating shaft and shifts axially, the fluid filled in the first and second sub cavities is forced to flow from one sub cavity to another through the oiling slot and/or the radial clearance, thus, it can provide a damping effect on the relative rotation between the rotating shaft and the body.

The depth or width of the oiling slot changes gradually.

Another scheme of the present invention is a damping mechanism applied for pivotally connecting a pivotal rotation piece and a fixing seat. The damping mechanism comprises:

A body connected with one of the pivotal rotation piece and the fixing seat, the body defining a cavity;

A rotating shaft, one end inserted into the cavity, the other end connected with the other one of the pivotal rotation piece and fixing seat;

The cavity divided along the central axial direction into a first sub cavity and a second sub cavity, then the fluid filled in the first and second sub cavities being forced to flow from one sub cavity to another along with the rotation of the rotating shaft, thus providing a damping effect on the relative rotation between the rotating shaft and the body;

The rotating shaft is provided with a radially outwardly-opening and axially-extending oiling slot on the path between the first sub cavity and the second sub cavity while the depth or width of the oiling slot changes gradually.

This scheme is based on the plunger-type damping mechanism. The division of the first sub cavity and the second sub cavity can be accomplished through the fit of the piston and the inner wall of the cavity, or through the fit of the guide surface of the rotating shaft and the cavity to control the cross-section size of the division path.

DESCRIPTION OF THE PREFERRED EMBODIMENTS

Figure 1:
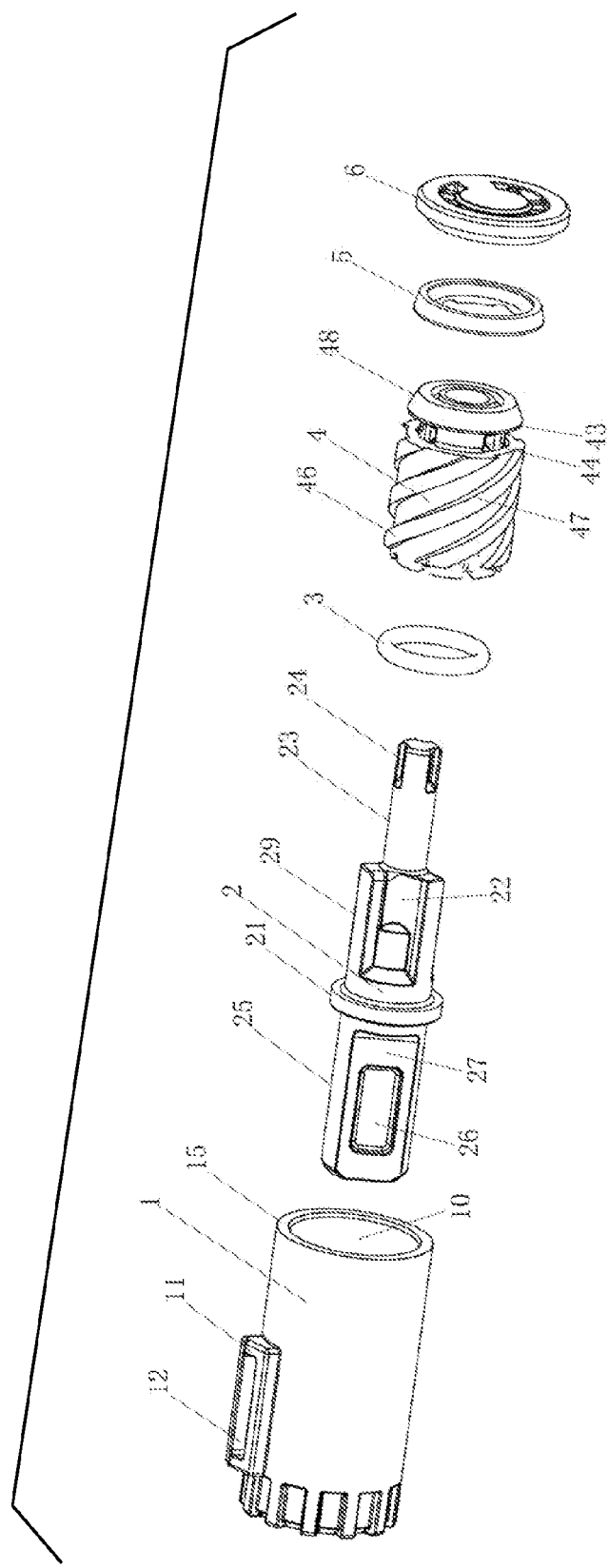
FIG. 1 shows a stereoscopic exploded view of the present invention.
Figure 2:
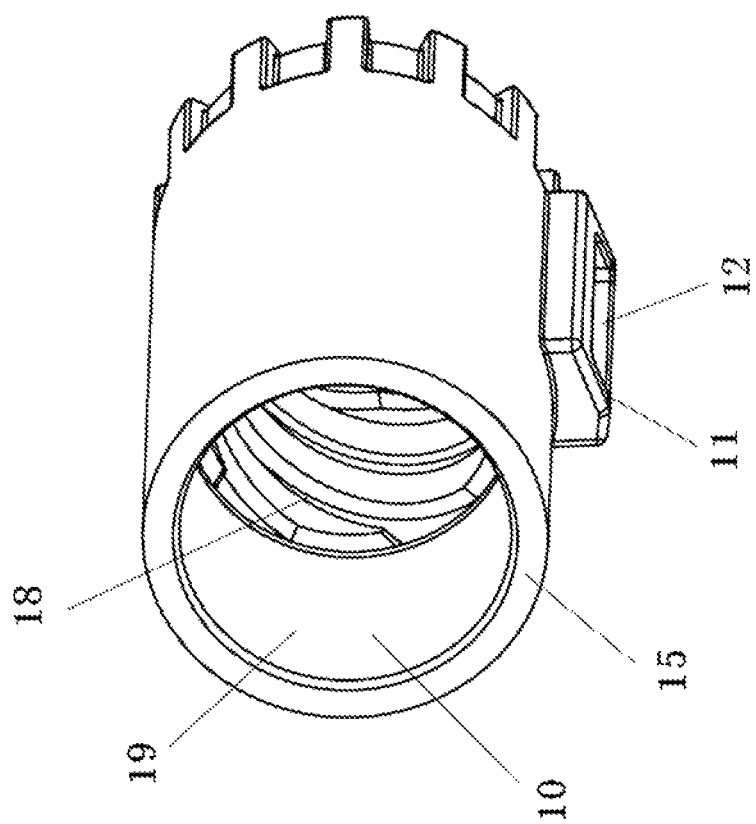
FIG. 2 shows a stereoscopic view of the housing body in the present invention.
Figure 3:
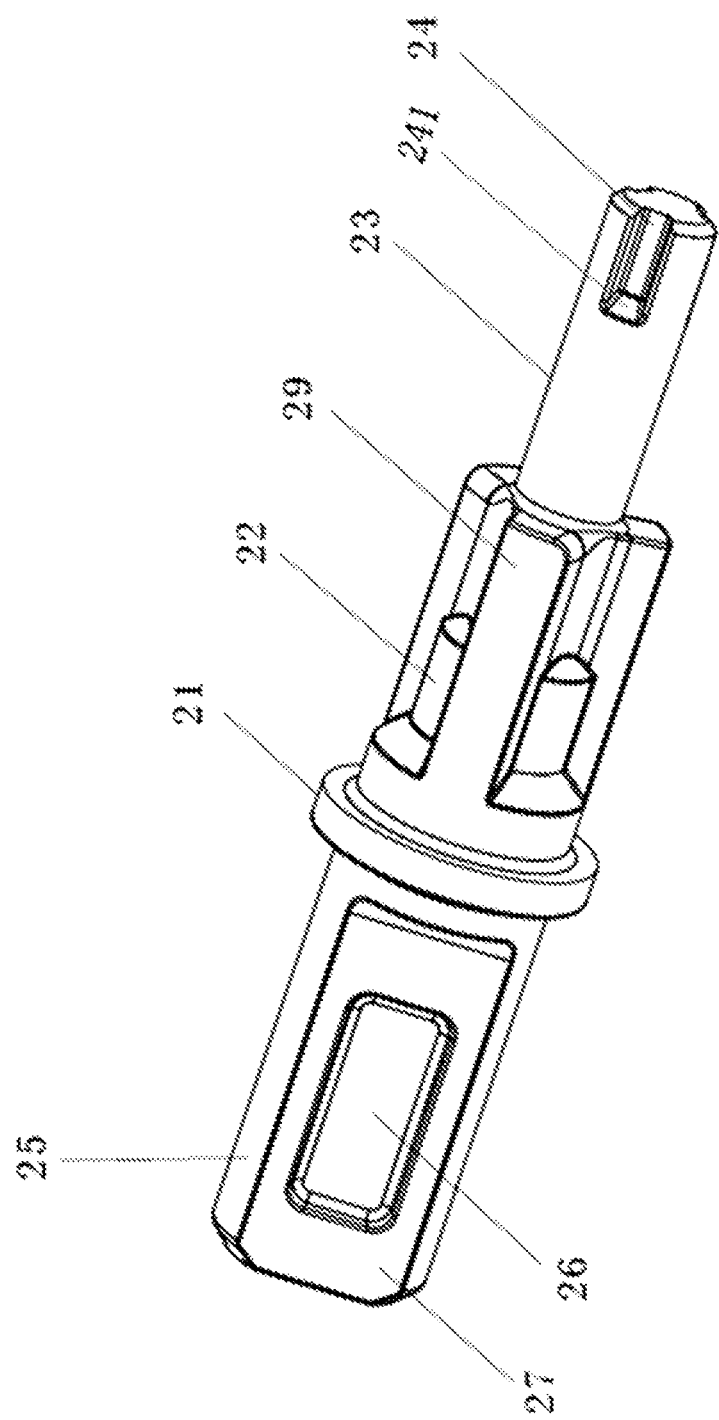
FIG. 3 shows a stereoscopic view of the rotating shaft in the present invention.
Figure 5:
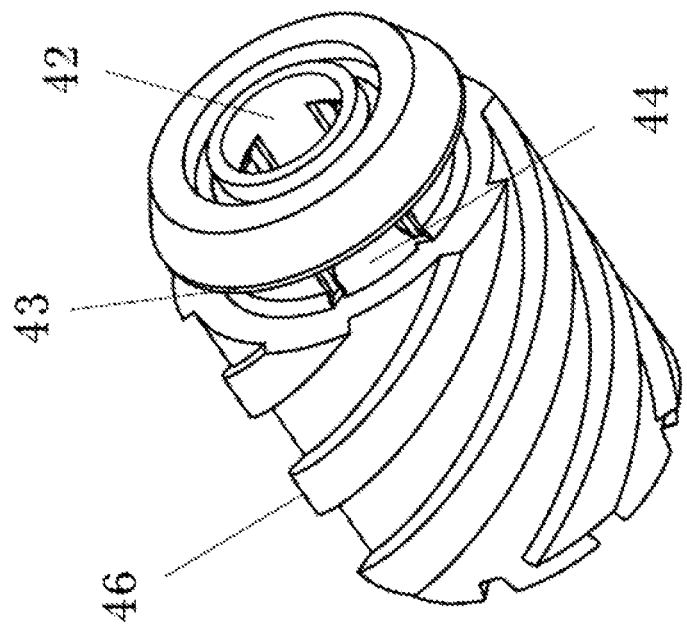
FIG. 4 and FIG. 5 provide a stereoscopic drawing of the piston in the present invention.

A damping mechanism in the present invention is for example for pivotally connecting a pivotal rotation piece (such as a toilet lid which is not shown) and a fixing seat (such as a toilet seat which is not shown). The damping mechanism comprises: a housing body 1 connected with one of the pivotal rotation piece and the fixing seat, wherein the connector is just like the connecting hole 12 and the connecting hole seat 11 of the housing body. The housing body 1 defines a cylindrical cavity 10 (it can be a stepped columnar cavity in other embodiments not shown) having a central axis, a first axial end (left end of the housing body 1 as shown in FIG. 1 and FIG. 2) and a second axial end (right end of the housing body 1 as shown in FIG. 1 and FIG. 2) axially opposite to the first axial end along the central axial direction. The cavity 10 is arranged with a first axial opening 16 (as shown in FIGS. 8 to 11) at the first axial end. The cavity 10 extends outside the housing body 1 through the first axial opening 16. The aperture of the first axial opening is less than the diameter of the adjoining cross-section of the cavity and the first axial opening along the direction perpendicular to the central axis. Thus, the first axial end forms a hole shoulder 17 (as shown in FIG. 11) radially inwardly-stretching. The second axial end has an end wall 60 (as shown in FIG. 11) covering the cavity axially. Exactly, the housing body 1 includes the hole shoulder 17, that is, the space defined by the first axial opening 16 in the housing body 1 is collectively called cavity 10.

Although the end wall 60 and the housing body 1 is connected to each other in a split type as shown, but they can be incorporate as well. And though the hole shoulder 17 and the housing body 1 is incorporate as shown, but they also can be connected to each other in a split type. It is aim at benefiting for processing and installing the present invention.

As is shown in FIG. 1, FIG. 3, and FIGS. 8 to 11, the present invention also comprises: a rotating shaft 2, the rotating shaft having a middle shaft segment 21 stretching into the cavity 10 from the first axial opening 16 along the central axial direction and a shaft shank 25 stretching outside the housing body 1 from the middle shaft segment in incorporate or exploded type along the opposite direction. The shaft shank is designed for example for connecting the rotating shaft 2 and the other one of the pivotal rotation piece and fixing seat through the connecting hole 26 and the connecting hole seat 27 of the shaft shank. The boundary between the middle shaft segment 21 and the shaft shank 25 is the first axial opening 16. The middle shaft segment 21 is radially support-fitted with the housing body 1, especially with the hole shoulder 17 of the housing body. Thus, the rotating shaft 2 can rotate around the central axis relative to the housing body 1. The rotating shaft also comprises a first shaft segment 22 stretching into the cavity 10 from the middle shaft segment along the central axial direction and a second shaft segment 23 stretching forward again from the first shaft segment along the central axial direction. The first shaft segment 22 and the second shaft segment 23 are collectively called shaft stretching segment. As the shaft stretching segment has a free end portion (namely the second shaft segment 23) and for that the end wall 60 on the second axial end (the right end as shown) of the housing body 1 has a counter bore that can accommodate the second shaft segment 23 or the free end portion, so, the end wall 60 combining with the hole shoulder 17 can support and limit the axial left or right shift of the rotating shaft 2 relative to the housing body 1, as shown in the figure. Additional to the structure shown in the figure, structures of only using one of the middle shaft segment and the free end portion combining with the housing body (including the end wall 60) for forming an axial relative limit are also allowed. This is not difficult for accomplishment.

Figure 4:
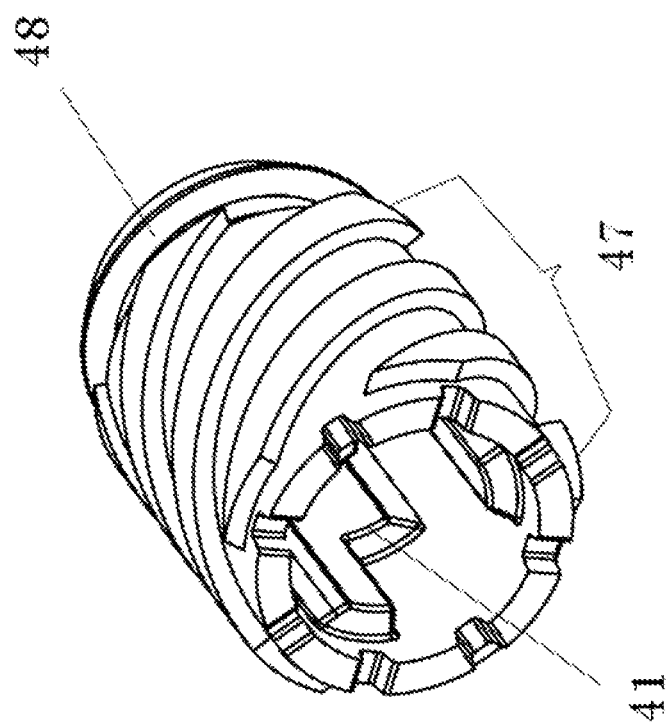
Figure 6:
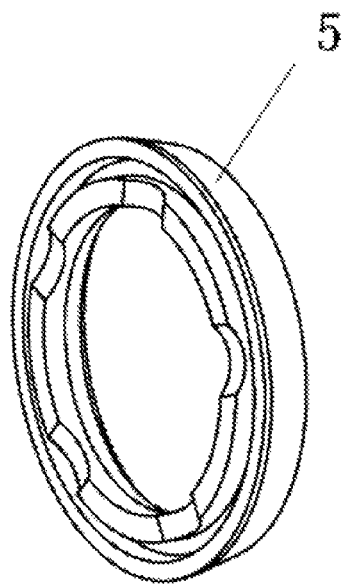
FIG. 6 shows a stereoscopic view of the check valve plate in the present invention.
Figure 7:
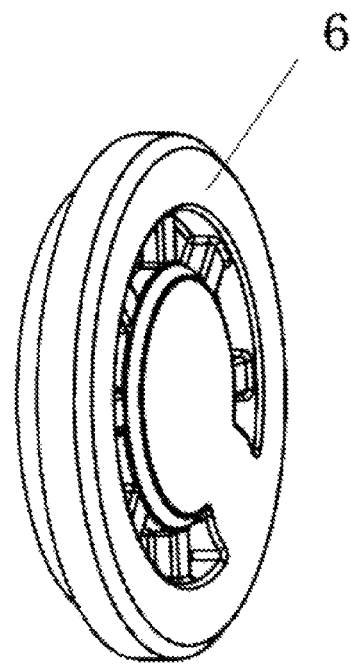
FIG. 7 shows a stereoscopic view of the end cover in the present invention.

Wherein, the cavity 10 also comprises a threaded section 18 and a smooth section 19; the shaft stretching segment (namely the first shaft segment 22 plus the second shaft segment 23) of the rotating shaft 2 is axial sheathed in a piston 4; the piston comprises a threaded section 47 disposed with a male thread 46 revolving about the central axis and a piston head 48. The threaded section 18 of the cavity and the threaded section 47 of the piston constitute a screw-on fit relationship between the female and male threads. The piston head 48 and the smooth section 19 of the cavity constitute a relatively-sliding sealing relationship along the axial and circular directions. For example, a sealing ring or a piston ring arranged on the piston head can be sleeved between the piston head 48 and the smooth section 19 of the cavity, so that the piston head 48 and the smooth section 19 of the cavity can constitute a relatively-sliding sealing relationship along the axial and circular directions. Therefore, piston head 48 divides the cavity 10 along the central axial direction into a first sub cavity 13 close to the middle shaft segment and a second sub cavity 14 axially opposite to the first sub cavity. The piston 4 and the first shaft segment 22 (even the second shaft segment 23 or the free end portion, not shown) constitute an axial free slide and circular drive fit relationship (for example, through keys, pins, key slots, or gear train axial plugged in to each other, such as the key 29 of the first shaft segment and the key or gear 41 of the piston shown in FIG. 1, FIG. 3 and FIG. 4). The second shaft segment 23 or the free end portion is radially clearance-fitted with the piston head 48 in the meantime (for example, through the radial clearance-fitting relationship between the axial hole section 42 of the piston head and the second shaft segment 23, they can also constitute a fit relationship by key and gear, or be sleeved in a proteiform elastic collar (not shown)), thus they can revolve or axially shift relative to each. Therefore, when the piston 4 revolves along with the rotating shaft 2 and removes along the axial direction, the fluid filled in the first and second sub cavities 13 and 14 is forced to follow from one sub cavity to another through the radial clearance between the axial hole section 42 of the piston head and the second shaft segment 23, or through the radial clearance squeezed out relative to the second shaft segment 23 when the elastic collar is extruded. And thus, it can provide a damping effect on the relative rotation between the rotating shaft 2 and the housing body 1.

Although the axial hole section 42 is existing in the piston head 48 and is axial freely-sliding and radial clearance-fitting with the shaft stretching segment as shown, but the axial hole section can also be formed in other positions of the piston 4 and be axial freely-sliding and radial clearance-fitting with the shaft stretching segment (not shown).

Although the middle shaft segment 21 is radial support-fitted with the housing body, especially the hole shoulder 17, so that the rotating shaft 2 can rotate around the central axis relative to the housing body 1 as shown, but in fact, the rotating shaft also can rotate through the fit of the piston 4 and the supporting manner, or through the piston bracing to the housing body 1 alone.

As shown, the middle shaft segment 21 is a shaft shoulder which is radial and axial support-fitted with the hole shoulder 17. However, the middle shaft segment can be replaced with a neck or an annular slot, for constituting a radial and/or axial support-fitted relationship with the housing body 1, especially its hole shoulder or some form of convex shoulder (not shown).

The free end portion of the shaft stretching segment can also have a neck, an annular slot or a shaft shoulder, for constituting a radial and/or axial support-fitted relationship with the housing body 1, especially its end wall 60 (not shown).

The better scheme is to dispose the second shaft segment 23 or the free end portion with a radial outwardly-opening and axially-extending oiling slot 24. The axial length of the oiling slot is clearly greater than that of the axial hole section 42 of the piston head. Therefore, when the axial hole section 42 of the piston head slides onto the oiling slot along the second shaft segment, the first and second sub cavities 13 and 14 can communicate with each other by liquid through the oiling slot 24. Thus, the effect of the liquid damping on the relative rotation between the body and the rotating shaft is remarkably relieved, so that the rotation even can not feel the damping effect. As shown, the oiling slot 24 is slotted at the shaft segment of the second shaft segment 23 or the free end portion, which is close to the free end side. Nevertheless, the oiling slot also can be slotted at the shaft segment of the second shaft segment 23 or the free end portion, which is far away from the free end side, even at the first shaft segment 22.

The oiling slot 24 also can be a helical or other curvy shape.

One end of the oiling slot 24 is a buffer section whose lateral section is gradually reduced. Thus, the mechanism can gradually transform the un-damped state into the damped state, and the motion of the mechanism can be smoother.

In the present embodiment, three gradually varied oiling slots 24 are arranged on the second shaft segment 23 or the free end portion of the rotating shaft. Their gradually changing manner is that the depth is a constant while the side wall 241 of the oiling slot is gradually shallowing along the direction opposite toward the free end. In this way, when the piston head is sliding onto the oiling slot, the oiling path is gradually diminishing.

Another better scheme is to dispose the piston head 48 with a check valve path, so that when the piston head is axially sliding toward the oiling slot 24, the second sub cavity and the first sub cavity can communicate with each other by liquid through the check valve path. Therefore, the piston and its head can slide all the way nearly without any influence of the liquid damping when the piston head 48 is axially sliding toward the oiling slot along the second shaft segment. And when the piston head is axially sliding away from the oiling slot, the check valve is closed. Then, when the piston head 48 lefts the oiling slot 24 axially along the second shaft segment, the sliding of the piston and its head relative to the second shaft segment is affected by the liquid damping.

The concrete structure of the check valve path comprises: an annular slot 43 on the piston head 48, the annular slot radial outwardly-opening and opening for the second sub cavity 14; a pressure-relieving hole path 44 toward the first sub cavity from the annular slot 43; and a check valve ring 5 sleeved on the annular slot 43, wherein the check valve ring can shift axially in the annular slot and axially slide in a seal manner supporting against the smooth section 19 of the cavity flexibly or elastically. When the piston head slides axially toward the oiling slot along the second shaft segment 23, the check valve ring 5 shifts toward the direction opposite to the piston head (left as shown) in the annular slot 43, then the second sub cavity 14 and first sub cavity 13 can communicate with each other by liquid through the axial clearance (the axial clearance between the check valve ring 5 and the side 45 of the annular slot 43) opened by the relative shift between the check valve ring 5 and the annular slot 43, and through the pressure-relieving hole path 44. And when the piston head slides away from the oiling slot, the check valve ring shifts toward the oiling slot relative to the piston head (right as shown) in the annular slot, the axial clearance is closed (the fit of the check valve ring 5 and the side 45 of the annular slot 43 is closed), and the liquid path of the first and second sub cavities through the pressure-relieving hole path is closed by the check valve ring. The structure of the check valve path in this paragraph is only a preferred one, other structures are allowed too. A plurality of structures of the check valve path well known in this field also can be applied in the present invention.

Another better scheme is that the pressure-relieving hole path 44 radially inwardly passes through the piston head 48 from the radial base of the annular slot 43 for directly or indirectly communicating with the first sub cavity. For example, it can communicate with the first sub cavity 13 through the sections of the piston 4 but without its head.

Another better scheme is that the threaded section 47 of the piston and the threaded section 18 of the cavity constitute a screw-on fit relationship. Thus, their nominal diameter and tensile strength become large relative to the whole damping mechanism. It is aim at transferring the liquid damping effect to the relative rotation between the rotating element and the fixing seat more effectively.

Another better scheme is that the male thread 46 is a multiple thread. For the rotation angle limit of the damping mechanism, using the long-pitch screw and the multiple thread can enhance the global intensity of the thread.

The concrete structure of the liquid sealing of the cavity 10 formed at the first axial end (the left end of the housing body) of the housing body 1 is that the middle shaft segment 21 of the rotating shaft is sleeved with a sealing ring 3, wherein the sealing ring is axially extruded by the middle shaft segment 21 and the cavity 10, thereby constituting a sealing relationship with both axial sides of the sealing ring.

For benefiting for processing and installing, the better scheme of the present invention is that the second axial end of the housing body 1 comprises an opening end 15 so that the cavity can extend outside the housing body and an end cover 6 covering the opening end for sealing the cavity, wherein the end wall 60 of the second axial end is actually composed of the end cover.

Another better scheme is that the end wall 60 is disposed with a blind hole revolving about the central axis and opening to the cavity. The second shaft segment 23 or the free end portion is inserted into the blind hole, thereby constituting an axially top-touching and radially supporting relationship between them, wherein the blind hole forms a rotating base for supporting the rotations of the second shaft segment and the whole rotating shaft.

Another better scheme is that the circular drive relationship between the piston and the first shaft segment comprises a drive range of 30-60 degrees.

The following explains the working principle of the present invention.

Figure 8:
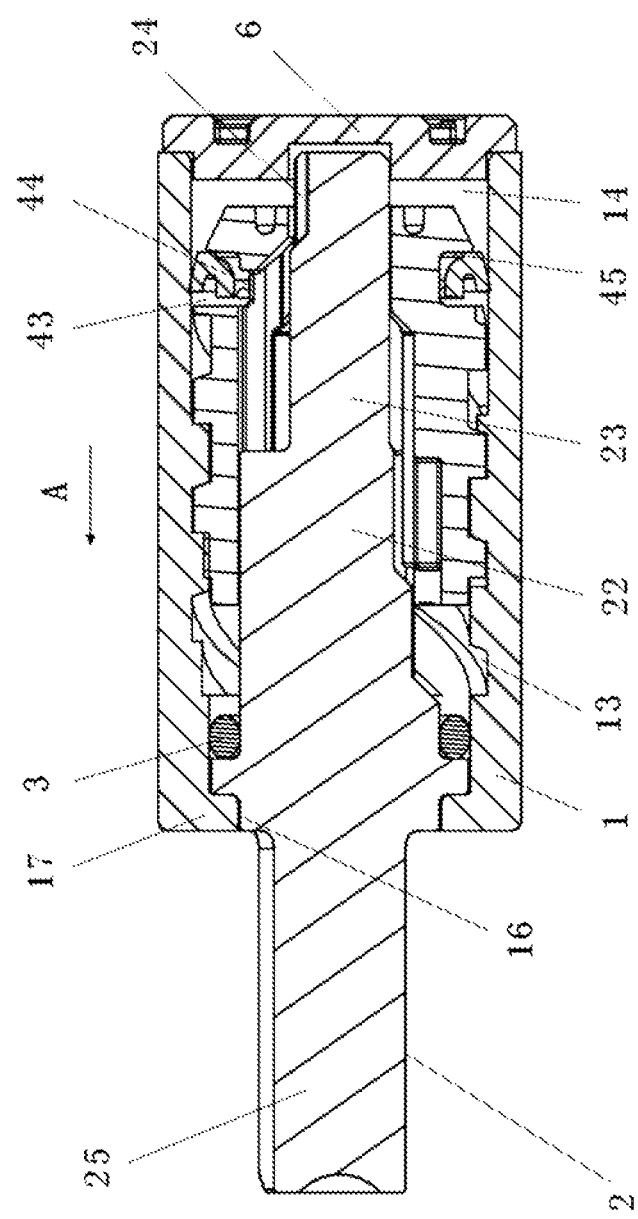
FIGS. 8 to 11 show a cutaway view for illustrating the working principle of the present invention.

As is shown in the FIG. 8, when the piston head 48 is near the right end, the angle between the toilet lid and the toilet seat is about 95-120 degrees. If flipping down the toilet lid, the housing body 1 and the rotating shaft 2 form a neutral drive range or stroke of 35-70 degrees (50 degrees is the best), that is, the rotating shaft and the housing body begin to have a relative turning of 35-70 degrees without transferring any torque revolving about the central axis. Thus, the piston 4 does not revolve relative to the housing body 1 for not receiving any torque from the shaft stretching segment of the rotating shaft 2 and not produce any axial displacement as well. Then, if the toilet lid is flipped down with an angle of x (35-70 degrees) degrees from the vertical direction, the flipping can be free and effort-saving and not drive the piston 4 to produce any axial displacement. Therefore, the axial displacement range of the piston and the axial length of the damping mechanism can be decreased.

When the flipped angle of the toilet lid is outside the neutral drive range, the continued flipping can drive the piston 4 and the housing body 1 produce relative displacement through the shaft stretching segment of the rotating shaft, wherein the fitted threads drive the piston produce leftward (as indicated by A) axial displacement relative to the housing body. In the meantime, the axial hole section 42 of the piston head 48 slides above the buffer section of the oiling slot 24 along the shaft stretching segment. Meanwhile, the check valve ring 5 scarcely produces any axial displacement for being tightly fitted with the housing body 1, thus constituting a seal relationship with the piston head. As the oiling slot 24 can smoothly communicate the first and second sub cavities 13 and 14, so when passing through the oiling slot, the liquid can produce a low-strength damping effect on the relative axial displacement between the piston and the housing body, i.e., the relative rotation between the rotating shaft and the housing body.

Afterwards, the toilet lid continues to be flipped down, the axial hole section 42 of the piston head therewith continues to slide leftward over the shaft stretching segment. When the flip angle of the toilet lid is beyond a certain range (such as 45-100 degrees) and the axial hole section 42 as shown leaves the oiling slot 24 and slides to the shaft stretching segment which is radially clearance-fitted with the axial hole section, the liquid is squeezed into the second sub cavity 14 with difficulty or damp through the radial clearance from the first sub cavity 13, thus producing an intense damping effect on the axial continued shift or leftward shift of the piston, i.e., the continued flipping down of the toilet lid. Therefore, the toilet lid can only slowly fall down to the level position while the piston 4 slides to the left end along the axial direction.

Figure 9:
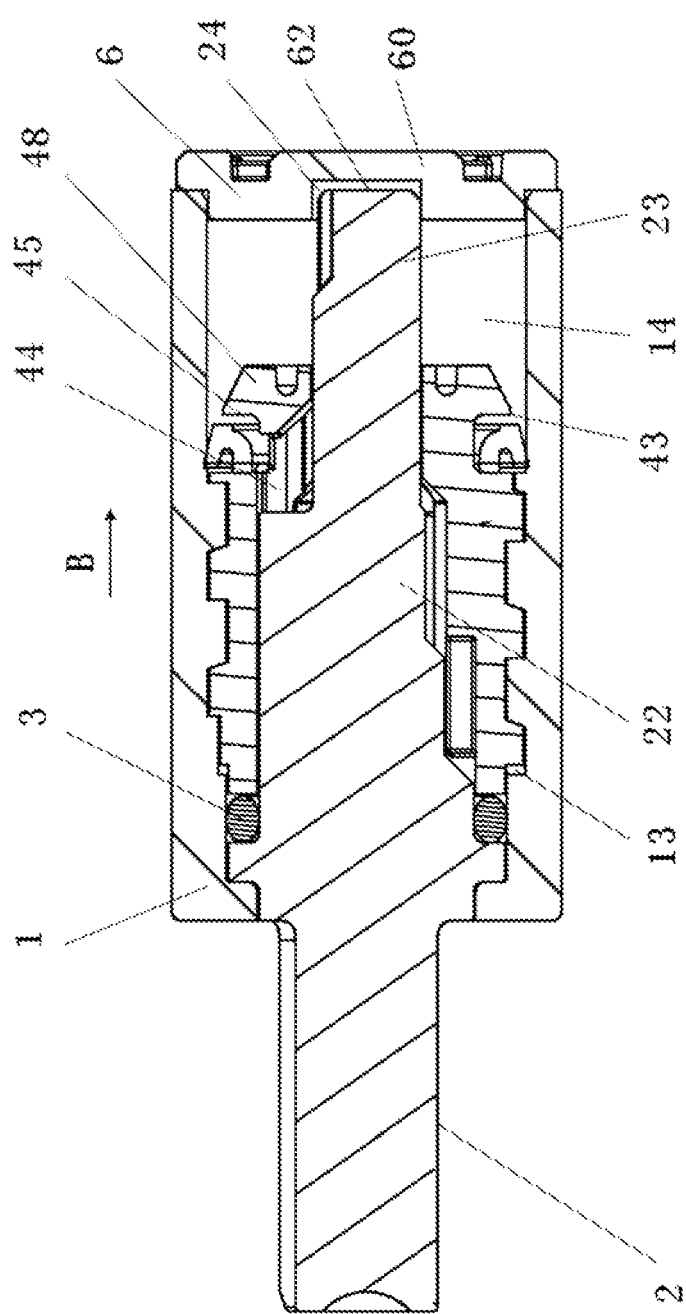
Figure 10:
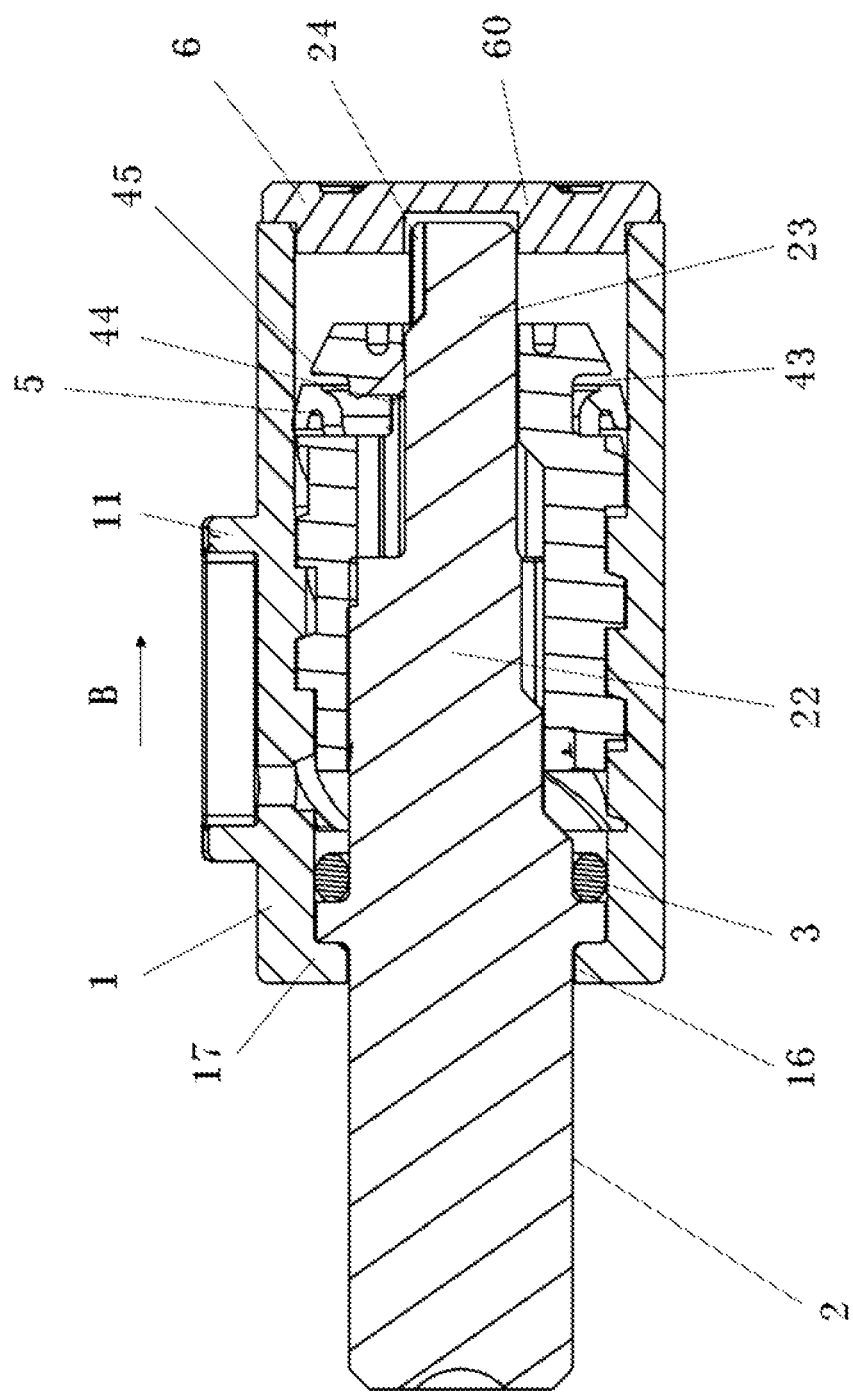
Figure 11:
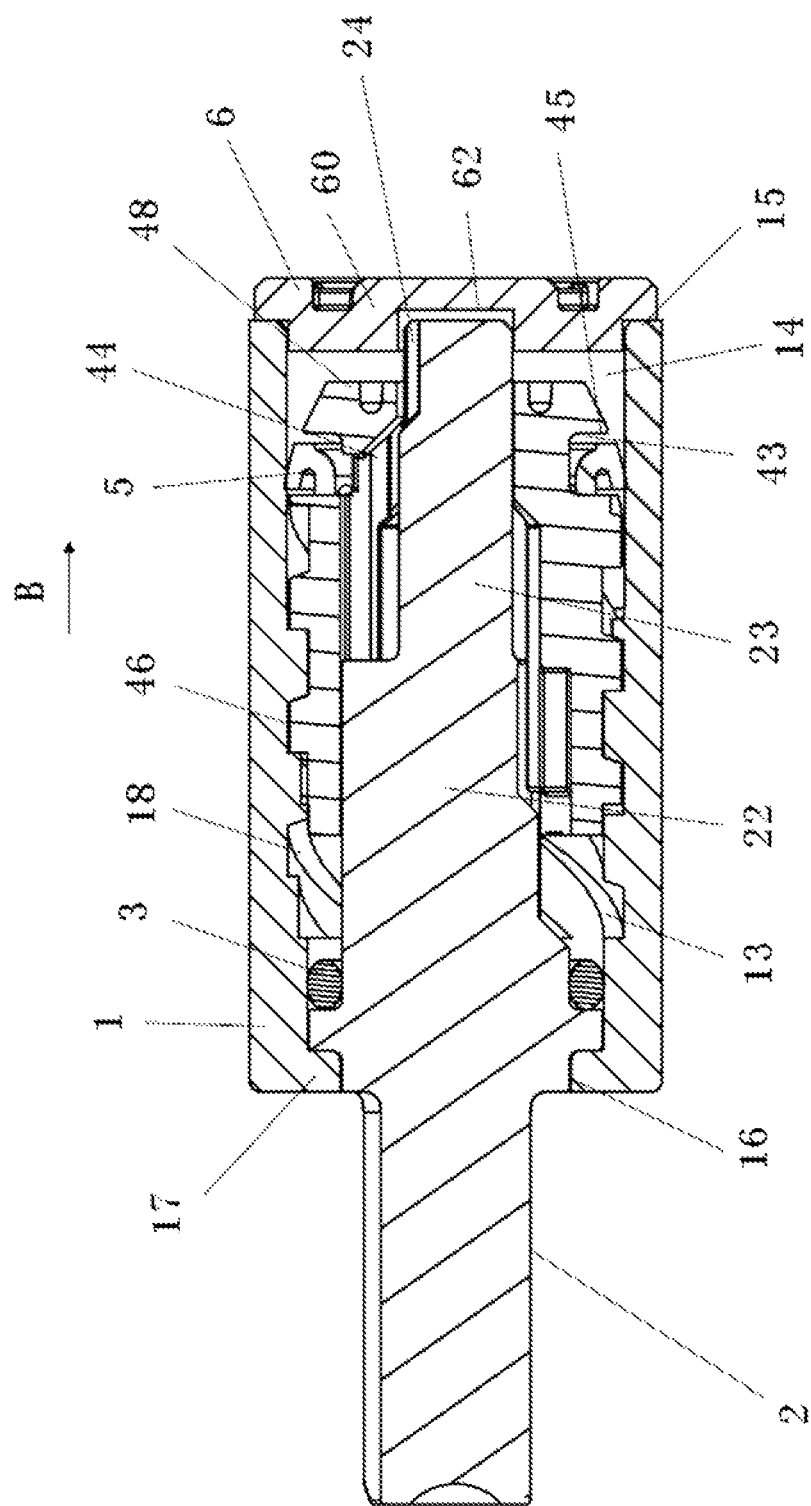
Figure 12:
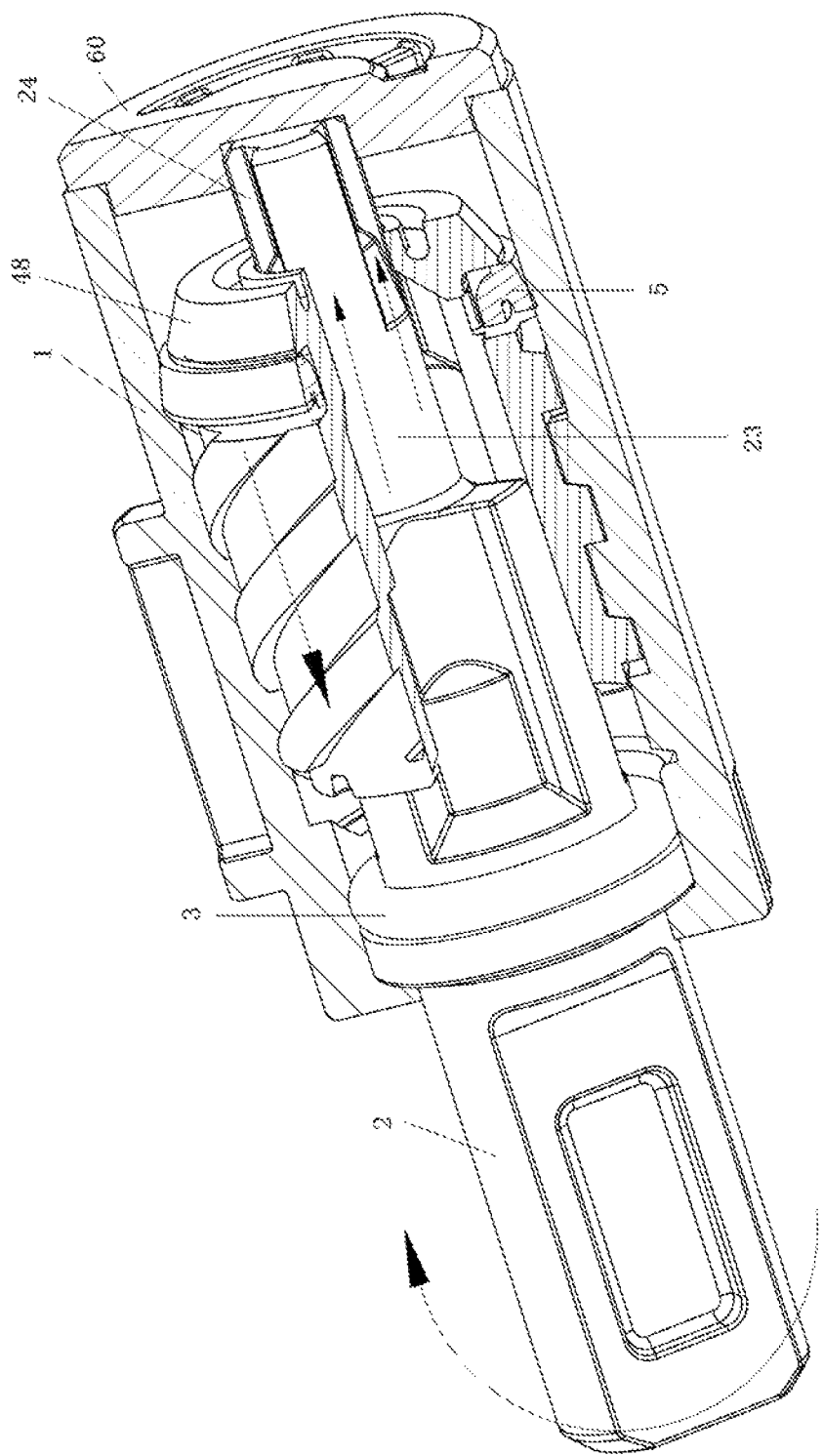
FIG. 12 and FIG. 13 show a cutaway stereoscopic view for illustrating the working principle of the present invention.
Figure 13:
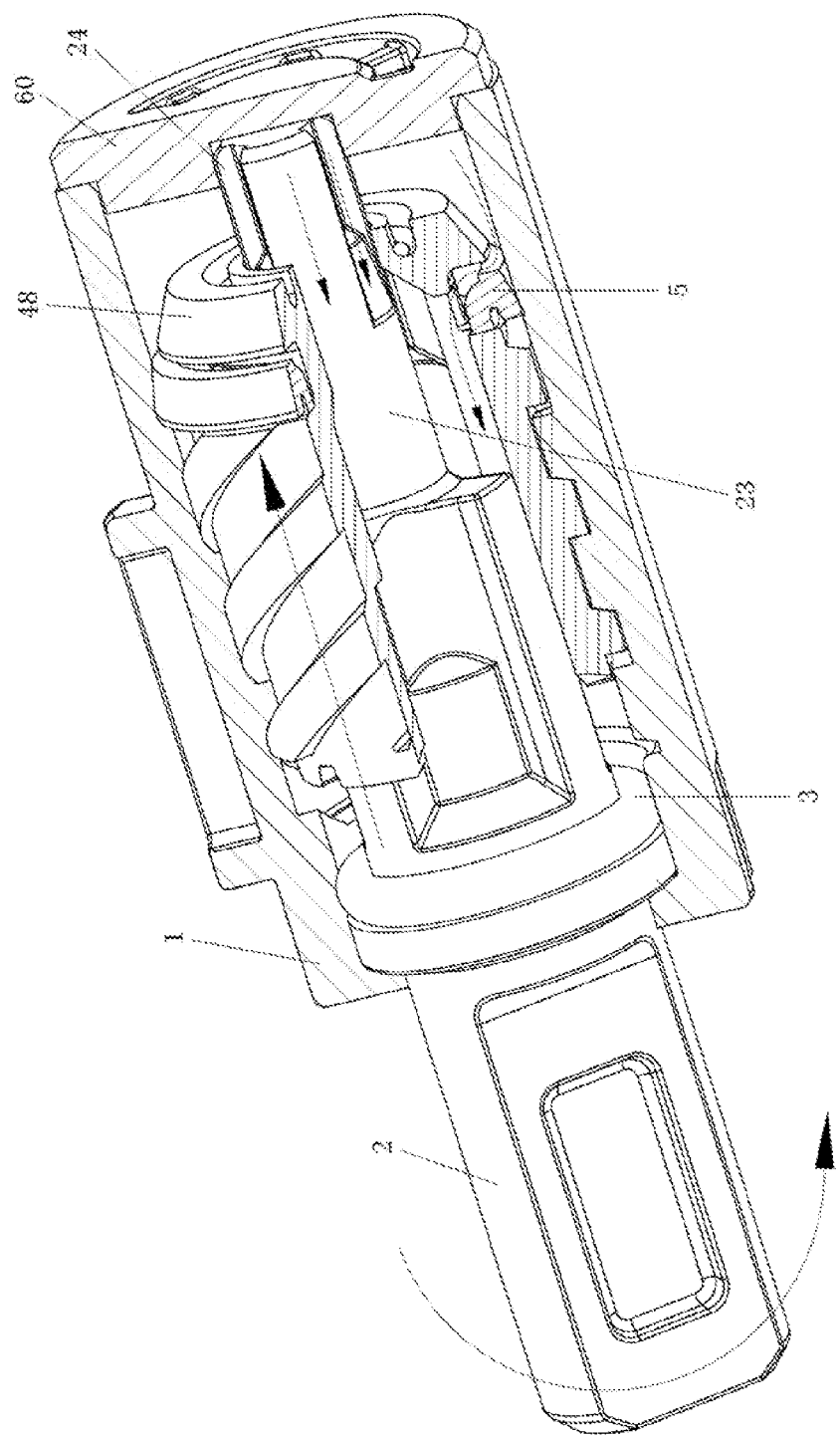

As is shown in the FIGS. 9 and 10, when the toilet lid is flipped up from the horizontal position and the piston 4 revolves and axially shifts right, the liquid from the second sub cavity 14 axially pushes the check valve ring 5 open from the side 45 (the reverse shift of the piston 4 along the axial direction drives the check valve ring being close to the side 45 of the annular slot 43 then) of the annular slot 43. In this way, the liquid from the second sub cavity 14 can smoothly flow into the first sub cavity 13 through the annular slot 43 and the pressure-relieving hole path 44, thus scarcely producing any damping effect on the axial right shift of the piston, i.e., on the upturning movement of the toilet lid. When the upwardly-turning angle of the toilet lid is x degrees, for the neutral drive range or strokemm, the rotating shaft continues to revolve while the piston 4 does not produce axial displacement. Therefore, the toilet lid can be smoothly flipped up to the vertical position.

As shown, the oiling slot is slotted at the free end portion of the shaft stretching segment or the second shaft segment 23. However, the oiling slot also can be slotted at the first shaft segment 22 (not shown). Thus, the toilet lid flipped down drives the piston 4 axially shift away from the middle shaft segment, the flipped-up one drives the piston axially shift toward the middle shaft segment, and naturally the check valve plate has a working process and direction contra what is shown in FIGS. 8 to 11.

It is worth mentioning that the first and second shaft segments can replace each other along the central axial direction, the piston therewith also needs to turn 180 degrees and be sleeved on the shaft stretching segment. Such physical designs can be considered substitutions to same object.

Figure 14:
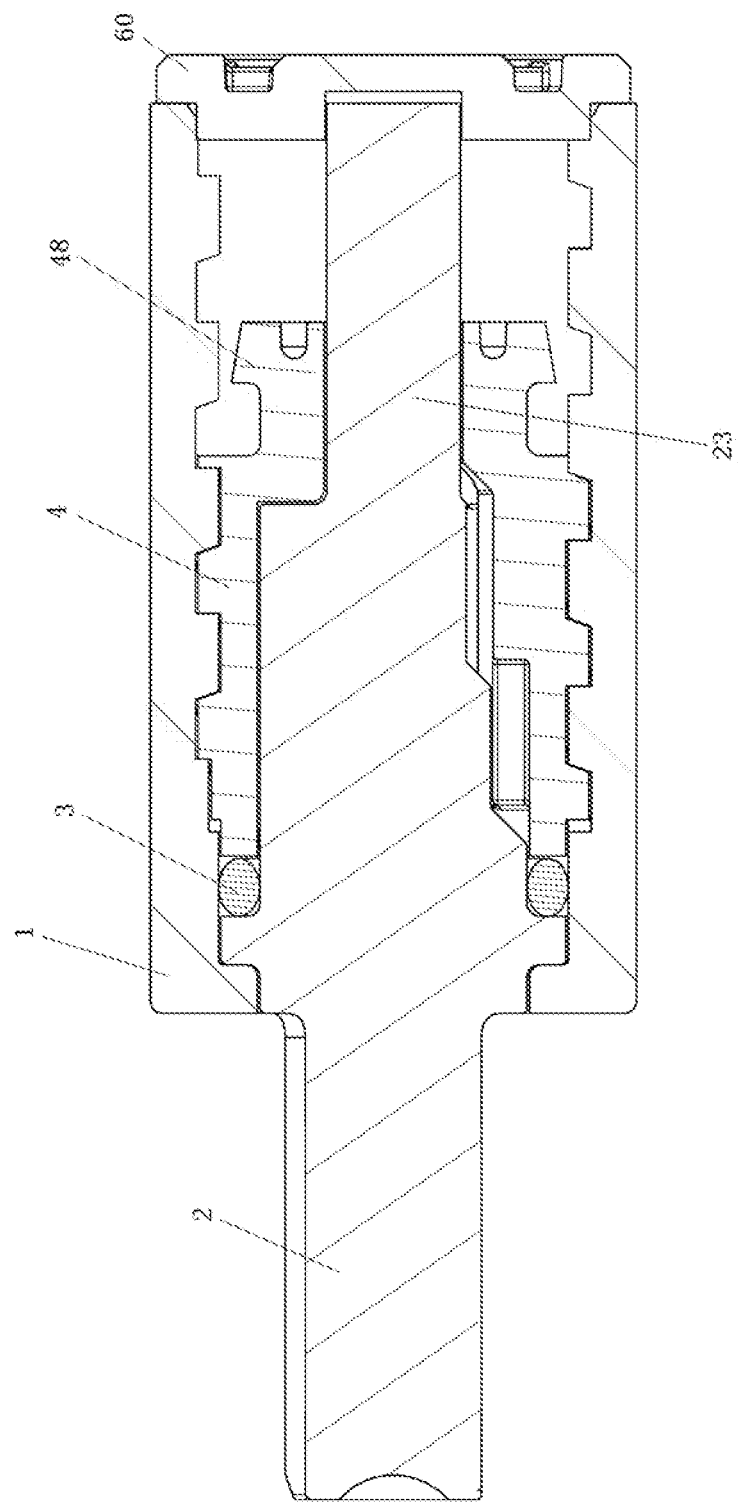
FIG. 14 shows a cutaway view of another implementation in the present invention.

As is shown in FIG. 14, another damping mechanism in the present invention is for pivotally connecting a pivotal rotation piece and a fixing seat. The damping mechanism comprises:

A body connected to one of the pivotal rotation piece and the fixing seat, the housing body defining a cavity having a central axis, the cavity comprising a threaded section disposed with female threads revolving about the central axis;

A rotating shaft inserted into the cavity, for being connected to the other one of the pivotal rotation piece and fixing seat; and A piston, wherein the piston comprises a threaded section disposed with male threads revolving about the central axis. The threaded section of the cavity and the threaded section of the piston constitute a screw-on fit relationship between the female and male threads. The piston can slide on the rotating shaft along the central axis. An axial hole section of the piston is radially clearance-fitted or seal-fitted with the rotating shaft, thereby dividing the cavity along the central axial direction into a first sub cavity and a second sub cavity axially opposite to the first sub cavity. When the piston revolves along with the rotating shaft and shifts axially, the invention is that the fluid filled in the first and second sub cavities is forced to flow from one sub cavity to another through the radial clearance between the axial hole section of the piston 4 and the rotating shaft 2, and/or through the clearance between the female and male threads, thus, it can provide a damping effect on the relative rotation between the rotating shaft and the housing body.

The rotating shaft is provided with a radial outwardly-opening and axially-extending oiling slot on the sliding path of the piston while the depth and/or width of the oiling slot changes gradually.

Figure 15:
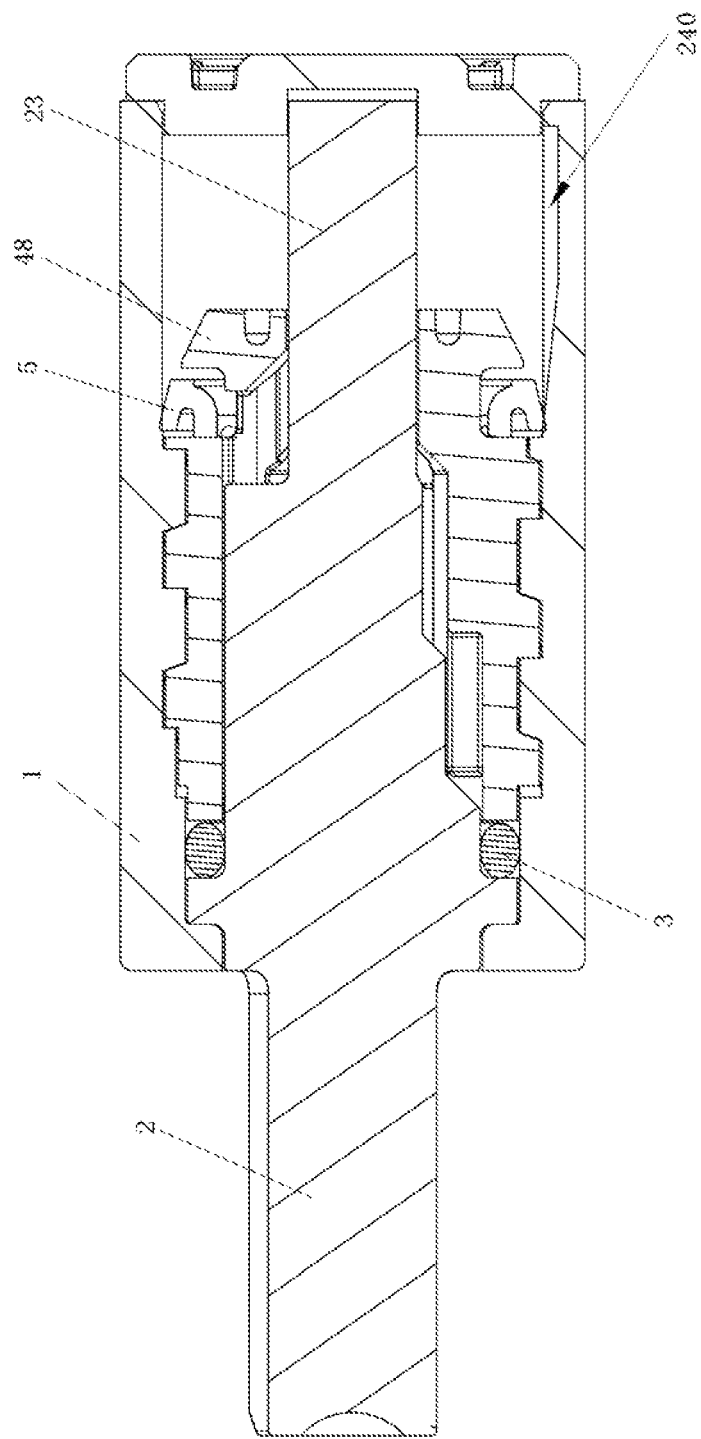
FIG. 15 also shows a cutaway view of another implementation in the present invention.

As is shown in FIG. 15, another damping mechanism in the present invention additional is for pivotally connecting a pivotal rotation piece and a fixing seat. The damping mechanism comprises:

A body connected to one of the pivotal rotation piece and the fixing seat, the housing body defining a cavity having a central axis, the cavity comprising a threaded section disposed with female threads revolving about the central axis and a smooth section disposed with one or more axially oiling slots 240 (similar to the oiling slot 24);

A rotating shaft inserted into the cavity, for being connected to the other one of the pivotal rotation piece and fixing seat; and A piston, wherein the piston comprises a threaded section disposed with male threads revolving about the central axis and a piston head. The threaded section of the cavity and the threaded section of the piston constitute a screw-on fit relationship between the female and male threads. The piston can slide on the rotating shaft along the central axis. The piston head is radially clearance-fitted or seal-fitted with the smooth section of the cavity in addition to the oiling slot area. An axial hole section of the piston is radially clearance-fitted or seal-fitted with the rotating shaft, thereby dividing the cavity along the central axial direction into a first sub cavity containing the threaded section of the cavity and a second sub cavity axially opposite to the first sub cavity. When the piston revolves along with the rotating shaft and shifts axially, the fluid filled in the first and second sub cavities is forced to flow from one sub cavity to another through the oiling slot and/or the radial clearance, thus it can provide a damping effect on the relative rotation between the rotating shaft and the housing body. The depth or width of the oiling slot changes gradually.

Industrial Applicability

The present invention is designed that the cavity is divided along the central axial direction into a first sub cavity and a second sub cavity, and the fluid filled in the first and second sub cavities is forced to flow from one sub cavity to another along with the rotation of the rotating shaft. Thus, it can provide a damping effect on the relative rotation between the rotating shaft and the body. Additionally, the rotating shaft is provided with a radial outwardly-opening and axially-extending oiling slot on the path segment between the first and second sub cavities while the depth and/or width of the oiling slot changes gradually. In that way, when the cover plate falls down fast, the damping mechanism can be used as a buffer role in the sudden stop. It can protect the cover plate and the relative connection mechanism, increase the service life and reduce the noise.

What is claimed is:

1. A damping mechanism, pivotally connecting a pivotal element and a stationary element, comprising:
   a body connected to one of the pivotal element and the stationary element, the body defining a cavity having a central axis, the cavity comprising a threaded section disposed with female threads revolving about the central axis, and a smooth section;
   a rotating shaft, one end of the rotating shaft being inserted into the cavity, the other end of the rotating shaft being connected to the other one of the pivotal element and stationary element, the rotating shaft being provided with a radially outwardly-opening and axially-extending oiling slot, the depth and/or width of the oiling slot changing gradually; and
   piston having a threaded section disposed with male threads revolving about the central axis, and a piston head, the threaded section of the cavity and the threaded section of the piston constitute a screw-on fit relationship between the female and male threads, the piston being slidable on the rotating shaft along the central axis, the piston head being radially clearance-fitted or seal-fitted with the smooth section of the cavity, an axial hole section of the piston being clearance-fitted or seal-fitted with the rotating shaft, thereby dividing the cavity along a central axial direction into a first sub cavity containing the threaded section of the cavity and a second sub cavity axially opposite to the first sub cavity;
   wherein when the piston revolves along with the rotating shaft and shifts axially, the fluid filled in the first and second sub cavities is forced to flow from one sub cavity to another through the radial clearance between the axial hole section of the piston and the rotating shaft, and/or through the radial clearance between the piston head and the smooth section of the cavity, to provide a damping effect on the relative rotation between the rotating shaft and the body
   and wherein the radially outwardly-opening and axially-extending oiling slot is on the sliding path of the piston head.

2. The damping mechanism according to claim 1, wherein the body has a first axial end and a second axial end axially opposite to the first axial end along the central axial direction; the cavity has a first axial opening outwardly-extending the body along the central axial direction at the first axial end; the second axial end has an end cover covering the cavity axially; and
   the rotating shaft has a middle shaft segment inserted into the cavity along the central axial direction from the first axial opening and a shaft stretching segment inserted into the cavity again along the central axial direction from the middle shaft segment; the shaft stretching segment has a free end portion; at least one axial relative limit is arranged between the body and at least one of the middle shaft segment and the free end portion; and
   the piston is slidable along the shaft stretching segment of the rotating shaft; the axial hole section is formed at the piston head and radially clearance-fitted with the shaft stretching segment.

3. The damping mechanism according to claim 1, wherein the shaft stretching segment is provided with the oiling slot; the axial length of the oiling slot is greater than that of the axial hole section, thus when the axial hole section slides onto the oiling slot along the shaft stretching segment, the first and second sub cavity communicate with each other by liquid through the oiling slot.

4. The damping mechanism according to claim 2, wherein the piston head is disposed with a check valve path, then when the piston head is sliding toward the oiling slot axially, the second sub cavity and the first sub cavity communicate with each other by liquid through the check valve path, and when the piston head is sliding away from the oiling slot axially, the check valve is closed.

5. The damping mechanism according to claim 4, wherein the check valve path comprises:
   an annular slot on the piston head, the annular slot radial outwardly-opening and opening for the second sub cavity;
   a pressure-relieving hole path toward the first sub cavity from the annular slot; and
   a check valve ring sleeved on the annular slot, wherein the check valve ring can shift axially in the annular slot and slide axially in a seal manner supporting against the smooth section of the cavity,
   wherein when the piston head slides axially toward the oiling slot, the check valve ring shifts toward the direction opposite to the piston head, then the second sub cavity and first sub cavity can communicate with each other by liquid through the axial clearance opened by the relative shift between the check valve ring and the annular slot, and through the pressure-relieving hole path; and when the piston head slides away from the oiling slot, the check valve ring shifts toward the oiling slot relative to the piston head in the annular slot, the axial clearance is closed and the liquid path of the first and second sub cavities through the pressure-relieving hole path is closed by the check valve ring as well.

6. The damping mechanism according to claim 5, wherein the pressure-relieving hole path radially inwardly passes through the piston head from the radial base of the annular slot for communicating with the first sub cavity.

7. A damping mechanism, for pivotally connecting a pivotal element and a stationary element, comprising:
a body connected to one of the pivotal element and the stationary element, the body defining a cavity having a central axis, the cavity comprising a threaded section disposed with female threads revolving about the central axis;
a rotating shaft inserted into the cavity, for being connected to the other one of the pivotal element and stationary element, the rotating shaft being provided with a radially outwardly-opening and axially-extending oiling slot, the depth or width of the oiling slot changing gradually; and
a piston having a threaded section disposed with male threads revolving about the central axis, threaded section of the cavity and the threaded section of the piston constitute a screw-on fit relationship between the female and male threads, the piston being slidable on the rotating shaft along the central axis, an axial hole section of the piston being radially clearance-fitted or seal-fitted with the rotating shaft, thereby dividing the cavity along the central axial direction into a first sub cavity and a second sub cavity axially opposite to the first sub cavity;
wherein when the piston revolves along with the rotating shaft and shifts axially, the fluid filled in the first and second sub cavities is forced to flow from one sub cavity to another through the clearance between the piston and the rotating shaft, and/or through the clearance between the female and male threads, to provide a damping effect on the relative rotation between the rotating shaft and the body; and
wherein the radially outwardly-opening and axially-extending oiling slot is on the sliding path of the piston head.

8. A damping mechanism, for pivotally connecting a pivotal element and a stationary element, comprising:
a body connected with one of the pivotal element and the stationary element, the body defining a cavity; and
rotating shaft, one end of the rotating shaft being inserted into the cavity, the other end of the rotating shaft being connected with the other one of the pivotal element and stationary element, the rotating shaft being provided with a radially outwardly-opening and axially-extending oiling slot, a depth or width of the oiling slot changing gradually;
wherein the cavity is divided along a central axial direction into a first sub cavity and a second sub cavity, fluid filled in the first and second sub cavities being forced to flow from one sub cavity to another along with the rotation of the rotating shaft, thus providing a damping effect on the relative rotation between the rotating shaft and the body; and
wherein the radially outwardly-opening and axially-extending oiling slot being on the path between the first sub cavity and the second sub cavity.

9. The damping mechanism according to claim 8, wherein the cavity has a central axis and comprises a threaded section disposed with female threads revolving about the central axis and a smooth section;
further comprising a piston having a threaded section disposed with male threads revolving about the central axis and a piston head; the threaded section of the cavity and the threaded section of the piston constitute a screw-on fit relationship between the female and male threads; the piston being slidable on the rotating shaft along the central axis, the piston head being radially clearance-fitted or seal-fitted with the smooth section of the cavity; an axial hole section of the piston being radially clearance-fitted or seal-fitted with the rotating shaft, thereby dividing the cavity along the central axial direction into a first sub cavity containing the threaded section of the cavity and a second sub cavity axially opposite to the first sub cavity;
wherein when the piston revolves along with the rotating shaft and shifts axially, the fluid filled in the first and second sub cavities is forced to flow from one sub cavity to another through the radial clearance between the axial hole section of the piston and the rotating shaft, and/or through the radial clearance between the piston head the smooth section of the cavity, to provide a damping effect on the relative rotation between the rotating shaft and the body; and
wherein the radially outwardly-opening and axially-extending oiling slot is on the sliding path of the piston head.

10. The damping mechanism according to claim 9, wherein the piston head is disposed with a check valve path, so that when the piston head slides toward the oiling slot axially, the second sub cavity and the first sub cavity communicate with each other by liquid through the check valve path, and when the piston head slides away from the oiling slot axially, the check valve is closed.

11. The damping mechanism according to claim 10, wherein the check valve path comprises:
an annular slot on the piston head;
a pressure-relieving hole path; and
a check valve ring sleeved on the annular slot, wherein the check valve ring can shift axially in the annular slot and slide axially to seal against a smooth section of the cavity,
wherein when the piston head slides axially toward the oiling slot, the check valve ring shifts toward the direction opposite to the piston head, so that the second sub cavity and first sub cavity communicate with each other by liquid through the axial clearance opened by the relative shift between the check valve ring and the annular slot, and through the pressure-relieving hole path; and when the piston head slides away from the oiling slot, the check valve ring shifts toward the oiling slot relative to the piston head in the annular slot, and the axial clearance is closed and the liquid path of the first and second sub cavities through the pressure-relieving hole path is closed by the check valve ring as well.

12. The damping mechanism according to claim 11, wherein the pressure-relieving hole path radially inwardly passes through the piston head from the radial base of the annular slot for communicating with the first sub cavity.

13. The damping mechanism according to claim 11, wherein the check valve ring is a V-shaped seal ring, the V shape opening toward the shaft stretching segment of the rotating shaft.

* * * * *